(12) United States Patent
Karlsson et al.

(10) Patent No.: US 9,394,943 B2
(45) Date of Patent: Jul. 19, 2016

(54) BEARING CAGE AND ROLLING ELEMENT BEARING

(71) Applicant: AKTIEBOLAGET SKF, Göteborg (SE)

(72) Inventors: Mikael R Karlsson, Norrköping (SE); Håkan Lindgren, Shanghai (CN)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/433,069

(22) PCT Filed: Sep. 20, 2013

(86) PCT No.: PCT/SE2013/000143
§ 371 (c)(1),
(2) Date: Apr. 2, 2015

(87) PCT Pub. No.: WO2014/054993
PCT Pub. Date: Apr. 10, 2014

(65) Prior Publication Data
US 2015/0240873 A1    Aug. 27, 2015

(30) Foreign Application Priority Data
Oct. 4, 2012 (SE) ..................... 1200595

(51) Int. Cl.
*F16C 33/66* (2006.01)
*F16C 19/24* (2006.01)
(Continued)

(52) U.S. Cl.
CPC ............. *F16C 33/6681* (2013.01); *F16C 19/24* (2013.01); *F16C 23/086* (2013.01); *F16C 33/4676* (2013.01); *F16C 33/541* (2013.01); *F16C 33/543* (2013.01);
(Continued)

(58) Field of Classification Search
CPC ...... F16C 19/24; F16C 33/66; F16C 33/6651; F16C 33/6681; F16C 33/4676; F16C 33/4694; F16C 2240/40; F16C 2240/82
USPC ............... 384/548, 572–573, 578, 470, 560; 29/898.067
See application file for complete search history.

(56) References Cited

U.S. PATENT DOCUMENTS 1,963,407 A     6/1934  Herrmann
1,966,775 A  *  7/1934  Weis ..................... F16C 19/28
                                                              384/578

(Continued)

FOREIGN PATENT DOCUMENTS

DE     3240074 A  *  5/1984  ............. F16C 33/46
DE     3616288 A1 * 11/1987  ............. F16C 23/086

(Continued)

*Primary Examiner* — Marcus Charles
(74) *Attorney, Agent, or Firm* — Bryan Peckjian; SKF USA Inc. Patent Dept.

(57) ABSTRACT

A bearing cage for retaining rolling elements of a rolling element bearing, the bearing cage having at least one first ring structure to which at least one first cage bar is connected. The at least one first cage bar comprises a side surface that is arranged to extend along an outer surface of a rolling element when the bearing cage is in use, whereby the side surface comprises a radially outer edge and a radially inner edge. The distance between the radially outer edges of two adjacent cage bars between which a rolling element is located when the bearing cage is in use is greater than the distance between two adjacent radially inner edges of the two adjacent cage bars.

15 Claims, 3 Drawing Sheets

(51) Int. Cl.
  *F16C 33/46* (2006.01)
  *F16C 23/08* (2006.01)
  *F16C 33/54* (2006.01)
  *F16C 19/38* (2006.01)
(52) U.S. Cl.
  CPC .......... *F16C 33/547* (2013.01); *F16C 33/6614* (2013.01); *F16C 33/6629* (2013.01); *F16C 19/38* (2013.01)

(56) References Cited

U.S. PATENT DOCUMENTS

| | | | | |
|---|---|---|---|---|
| 2,729,520 A * | 1/1956 | Ritchie | ................. | F16C 19/466 384/577 |
| 3,494,684 A | 2/1970 | Benson | | |
| 4,522,516 A * | 6/1985 | Neese | ................... | F16C 23/086 384/572 |
| 4,677,720 A * | 7/1987 | Alling | ................... | F16C 23/086 29/898.067 |
| 5,538,348 A * | 7/1996 | Honda | .................. | F16C 23/086 384/470 |
| 5,862,592 A * | 1/1999 | Harimoto | ............... | B21D 53/12 384/573 |
| 6,461,048 B1 | 10/2002 | Ioannides | | |
| 7,220,059 B2 * | 5/2007 | Gobel | .................. | F16C 19/386 384/551 |
| 7,296,933 B2 * | 11/2007 | Tsujimoto | ............. | F16C 19/364 384/571 |
| 7,753,593 B2 * | 7/2010 | Tsujimoto | ........... | F16C 33/4635 384/448 |
| 2003/0142893 A1 * | 7/2003 | Joki | ...................... | F16C 19/386 384/572 |
| 2007/0248297 A1 | 10/2007 | Shorr et al. | | |

FOREIGN PATENT DOCUMENTS

| | | | | |
|---|---|---|---|---|
| DE | 102009056354 A1 | 6/2011 | | |
| DE | 102011077214 A | 12/2011 | | |
| EP | 2476926 A | 7/2012 | | |
| GB | 961203 A | 6/1964 | | |
| GB | 2282859 A | 4/1995 | | |
| JP | 2004232724 A * | 8/2004 | ............. | F16C 33/46 |
| JP | 2008064151 A * | 3/2008 | ............. | F16C 33/48 |
| JP | 2008249102 A | 10/2008 | | |
| JP | 2008249103 A | 10/2008 | | |
| JP | 2008249105 A | 10/2008 | | |
| JP | 2012167695 A | 9/2012 | | |

* cited by examiner

BEARING CAGE AND ROLLING ELEMENT BEARING

CROSS REFERENCE TO RELATED APPLICATIONS

This is a National Stage Application claiming the benefit of International Application Number PCT/SE2013/000143 filed on 20 Sep. 2013, which claims the benefit of Sweden (SE) Patent Application Serial Number 1200595-5, filed on 4 Oct. 2012, both of which are incorporated herein by reference in their entireties.

TECHNICAL FIELD

The present invention concerns a bearing cage for a rolling element bearing and a rolling element bearing comprising at least one such bearing cage.

BACKGROUND OF THE INVENTION

A bearing cage is a separator structure that keeps the individual rolling elements of a rolling element bearing evenly spaced around a race.

Usually, rolling element bearings are supplied with an amount of lubricant grease for lubricating purposes. Ideally, the grease gradually releases its oil content, thus ensuring an extended lubrication of the bearing. It is desirable to apply the grease as close as possible to the parts to be lubricated, e.g. the surface of the rolling elements. In particular, the amounts of grease which are collected on the cage bars are beneficial. These amounts are close to the rolling elements, thus enabling a direct supply of oil thereto.

However, centrifugal forces, which occur when a rolling element bearing is in use and limited adhesion have a negative influence on the grease retention capacity of the bearing cage. As a result, the grease on the cage bars may disappear, and collect in other areas where no supply of lubricant towards the center of the rolling elements or the raceways of the rings is possible.

U.S. Pat. No. 6,461,048 concerns a cage for a rolling element bearing with improved grease retention. The cage comprises at least one ring shaped body carrying regularly spaced cage bars, each pair of adjacent cage bars defining a cage pocket for accommodating a rolling element. At least one of the cage bars comprises elements situated radially outside and/or inside, the element(s) defining at least one space for accommodation of grease.

SUMMARY OF THE INVENTION

An object of the present invention is to provide an improved bearing cage for retaining rolling elements of a rolling element bearing, which allows for better lubrication of the rolling element bearing and which facilitates assembly of a rolling element bearing.

This aim is achieved by a bearing cage comprising a bearing cage for retaining rolling elements, the bearing cage having at least one first ring structure to which at least one first cage bar is connected. The at least one first cage bar comprises a side surface that is arranged to extend along an outer surface of a rolling element when the bearing cage is in use, whereby the side surface comprises a radially outer edge and a radially inner edge. The distance between the radially outer edges of two adjacent cage bars between which a rolling element is accommodated when the bearing cage is in use is greater than the distance between two adjacent radially inner edges of the two adjacent cage bars. Lubricant can thereby be accommodated in the space between the outer surface of a rolling element and the side edge of a cage bar.

Such a bearing cage allows more grease to attach itself to the cage bars when the bearing cage is in use and a prolonged residence time of grease in a rolling bearing is thereby obtained, as well as more reliable lubrication of the rolling element bearing. Additionally, such a bearing cage enables the rolling elements of a rolling element bearing to be mounted in the rolling element bearing from above.

According to an embodiment of the invention the side surface of the at least one cage bar may comprise at least one chamfered edge. For example, the chamfered edge may be provided at the radially inner edge of the first cage bar.

According to another embodiment of the invention the bearing cage comprises a second ring structure to which at least one second cage bar is connected, whereby the at least one second ring structure is arranged to be located radially inwards of the at least one first ring structure. Lubricant may thereby be accommodated on the second ring structure when the bearing cage is in use.

According to an embodiment of the invention the at least one second cage bar may be constructed so that the diameter of the bearing cage is largest at a point/region along the length of the at least one second cage bar so as to improve lubricant flow towards rotational center of the rolling elements when the bearing cage is in use.

According to another embodiment of the invention the at least one second ring structure comprises at least one reservoir for the accommodation of lubricant when the bearing cage is in use. The at least one first ring structure may be integrally formed with the at least one second ring structure or it may be arranged to be connected to the at least one second ring structure, by means of a snap fit connection or welding for example.

The first ring structure and/or the second ring structure may comprise metal, such as steel, or any other suitable material. A first ring structure and/or second ring structure may for example comprise sheet metal.

According to an embodiment of the invention the at least one first cage bar is constructed so that the diameter of the bearing cage is largest at a point/region along the length of the at least one first cage bar so as to improve lubricant flow towards rotational center of the rolling elements when the bearing cage is in use. The expression "rotational center" is intended to mean the center of the rolling surface of a rolling element, which is located halfway between the ends of the rolling element.

The at least one cage bar may comprise a raised point/region anywhere along the length thereof which will increase the surface area of the at least one cage bar and consequently the amount of lubricant that can be accommodated thereon, and which will improve lubricant flow towards the rotational center of the rolling elements. More lubricant will thereby collect on the at least one raised point/region and then fall onto the rolling surface of the rolling element in the vicinity of the at least one raised point/region. It should be noted that at least one first cage bar may comprise a plurality of raised points/areas along its length so as to increase its surface area and improve lubricant flow towards the rotational center of rolling elements when the bearing cage is in use.

According to an embodiment of the invention a point/region is arranged to be located at a position above the center of the rolling surface of each rolling element when the bearing cage is in use. Lubricant falling from the point/region will thereby be supplied to the center of the rolling surfaces of the rolling elements, i.e. at a position halfway between the ends of each rolling element.

According to another embodiment of the invention the bearing cage comprises two axially opposed ring structures whereby the at least one cage bar extends between the axially opposed ring structures. The at least one first cage bar may comprise the point/region halfway between the two axially opposed ring structures.

According to a further embodiment of the invention the at least one first cage bar of the at least one first ring structure comprises end portions that follow the rolling element diameter profile. The end portions may extend over 5%-30%, preferably 10-20% of the length of the at least one cage bar. The point/region may be arranged in the central portion of the at least one first cage bar, which central portion extends between these end portions.

The bearing cage may be used in a rolling element bearing, such as a ball bearing or roller bearing, a cylindrical roller bearing, a toroidal roller bearing, a taper roller bearing, a conical roller bearing or a needle roller bearing.

The present invention also concerns a rolling element bearing comprises at least one bearing cage according to any of the embodiments of the invention.

BRIEF DESCRIPTION OF THE DRAWINGS

The present invention will hereinafter be further explained by means of non-limiting examples with reference to the appended figures where.

DETAILED DESCRIPTION OF EMBODIMENTS

Figure 1A:
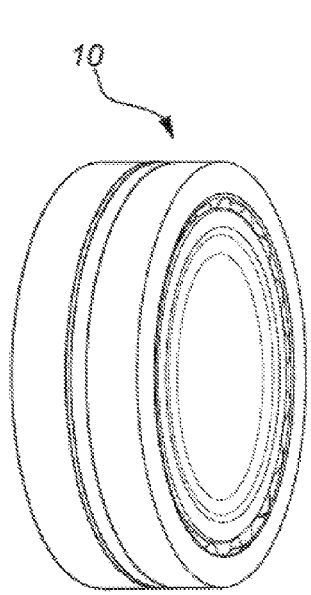
FIGS. 1a, 1b, and 1c show a bearing cage according to the prior art.
Figure 1B:
Figure 1C:
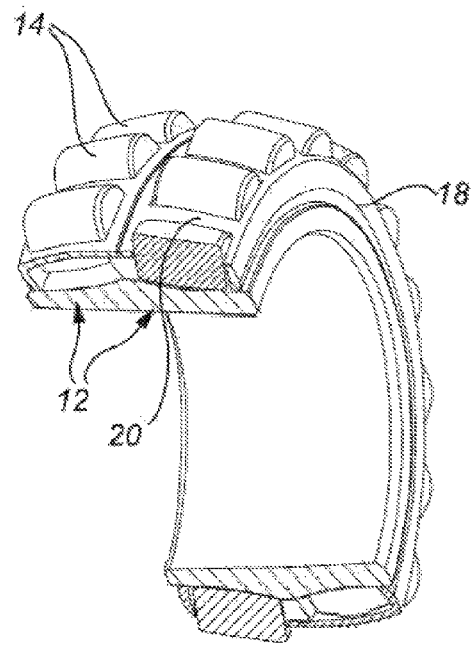

FIGS. 1a-c show a rolling bearing 10 according to the prior art. The rolling bearing comprises two bearing cages 12 for retaining rolling elements 14. Each bearing cage 12 comprises a ring structure 18 to which a plurality of cage bars 20 are connected. The cage bars 20 have a substantially flat outer surface that follows the diameter profile of the rolling elements 14. The diameter of each bearing cage 12 is largest at the rings of the ring structures 18 which are located in between the two rows of rolling elements 14.

Figure 2A:
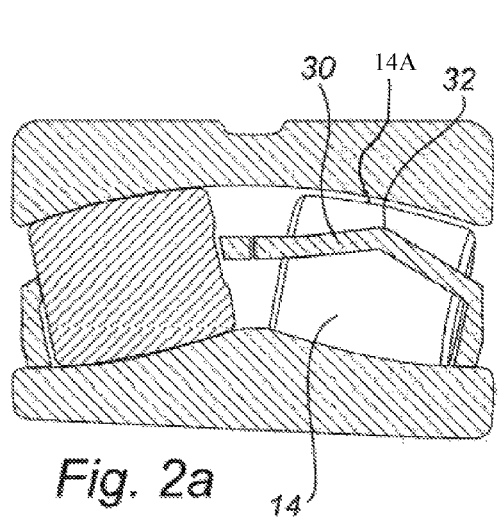
FIGS. 2a, 2b, 3a, 3b, 4a, and 4b show a rolling element bearing and a bearing cage according to embodiments of the invention.
Figure 2B:
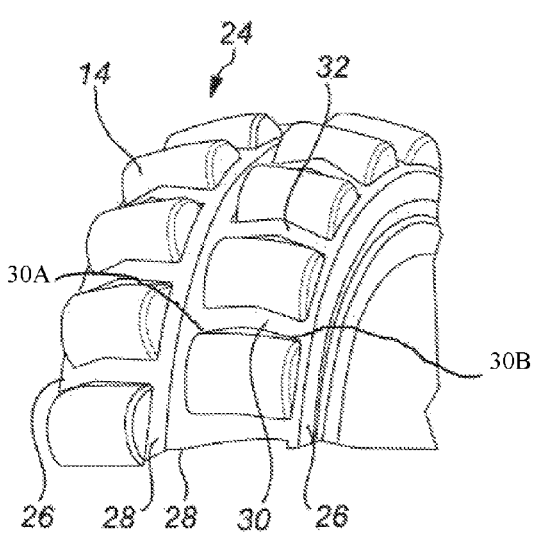

FIGS. 2a-b show two bearing cages 24 for retaining two rows of rolling elements 14 according to an embodiment of the present invention. Each bearing cage 24 comprises a pair of axially opposed rings 26, 28 whereby a plurality of first cage bars 30 extends between the two axially opposed rings 26, 28 such that each pair of adjacent cage bars defines a cage pocket 60 for accommodating a rolling element 14. All of the first cage bars 30 are constructed so that the diameter of each bearing cage 24 is largest at a point 32 halfway along the length of the first cage bars 30 for example, whereby the point 32 will be located at a position above the center of the rolling surface of each rolling element 14, so as to improve lubricant flow towards the rotational center of rolling elements 14 when the bearing cages 24 are in use. In the illustrated embodiment lubricant landing on the first cage bars 30 will flow towards an end of the cylindrical rolling elements 14. Lubricant collecting on the point 32 will namely fall onto the center of the rolling surface of each rolling element 14. Lubricant storage is increased as compared to cage bars 20 of a bearing cage 12 according to the prior art, due to the increased surface area of the first cage bars 30 of a bearing cage 24 according to an embodiment of the present invention.

Figure 3A:
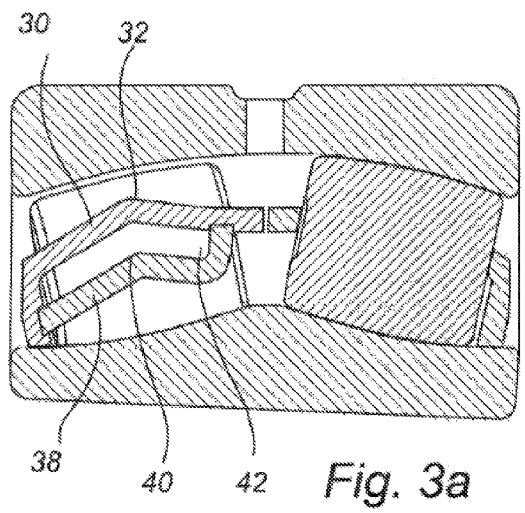
Figure 4A:
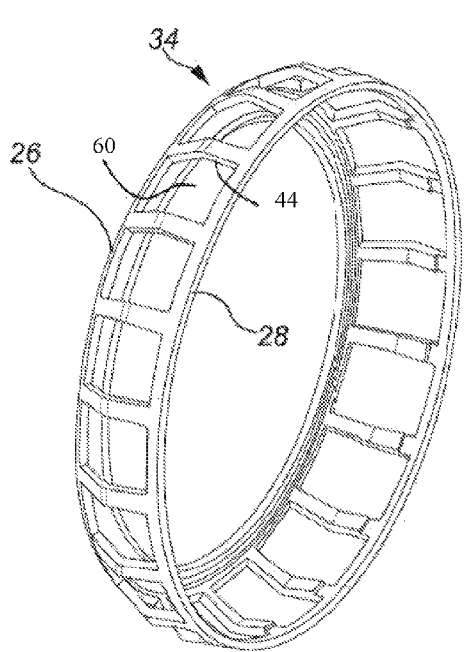

The first cage bars 30 may comprise end portions 30A, 30B that follow the rolling element diameter profile 14A. Said another way, and as best shown in FIG. 2b, the end portions 30A, 30B of the first cage bars 30 are configured such that they can contact the rolling element 14 outer surface during use while the point 32 (also referred to as an apex) is configured to be spaced from the outer perimeter of the rolling elements 14 during use. Such end portions may extend over 5%-30%, preferably 10-20% of the length of a first cage bar 30, whereby at least part of the central portion between the end portions is constructed so that the diameter of each bearing cage 24 is largest at a point/region therebetween so as to improve lubricant flow towards the rotational center of rolling elements 14 when the bearing cages 24 are in use. For example, at least part of the central portion between the end portions may be raised with respect to the end portions to form such a point/region of largest diameter. In general, the first cage bars 30 extend between first ring 26 and second ring 28 and are configured to define part of the pocket 60 which is configured to receive a rolling element 14 therein, as shown in FIGS. 2b and 4a. As shown in FIGS. 2a, 2b, and 3a, when the first cage bar 30 is viewed in axial cross section the first cage bar 30 has an apex 32 located between and spaced from the first and second rings 26, 28 such that a first cage bar outer diameter is a maximum at the apex and greater than the first and second ring outer diameters.

Figure 3B:
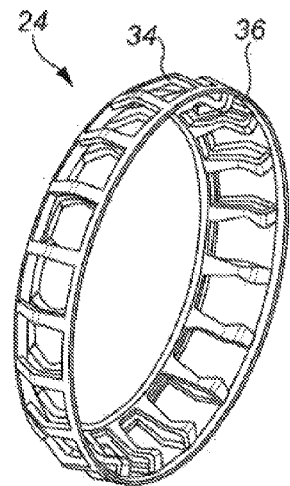

FIGS. 3a-b show a bearing cage comprising a first ring structure 34 comprising a pair of axially opposed rings 26, 28 whereby a plurality of first cage bars 30 extends between the two axially opposed rings 26, 28. The bearing cage 24 also comprises a second ring structure 36 to which a plurality of second cage bars 38 is connected, whereby the second ring structure 38 is arranged to be located radially inwards of the at least one first ring structure 34 when the bearing cage 24 is in use. The second cage bars 38 are constructed so that the diameter of the second ring structure 36 is largest at a point 40 along the length of the second cage bars 38 so as to improve lubricant flow towards the rotational center of rolling elements 14 when the bearing cage 24 is in use.

The "length" of a first or second cage bar 30, 38 is intended to mean the distance from a first ring 26 of a ring structure to the end of the first or second cage bar 30, 38 or to a second ring 28 of a ring structure, which distance is measured along the outer surface of the first or second cage bar 30, 38.

At least one first cage bar 30 and/or at least one second cage 38 bar may comprise at least one channel so as to improve lubricant flow towards the rotational center of rolling elements 14 when the bearing cage 24 is in use.

The second ring structure 38 may comprise at least one reservoir 42 for the accommodation of lubricant when the bearing cage 24 is in use.

Figure 4B:
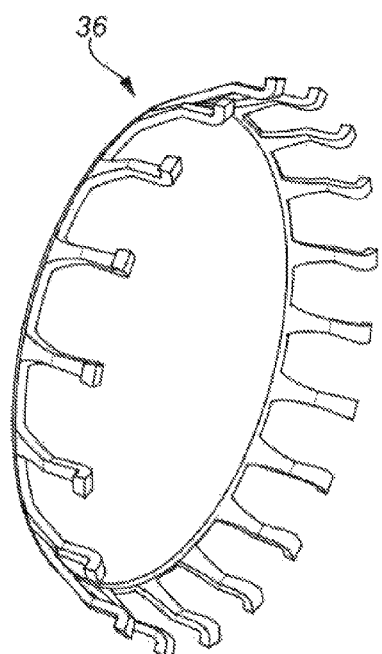

FIGS. 4a-b show a first ring structure 34 that is arranged to be connected to a second ring structure 36, for example by means of a snap fit connection or welding. Alternatively, the first ring structure 34 may be integrally formed with the second ring structure 36.

Figure 5A:
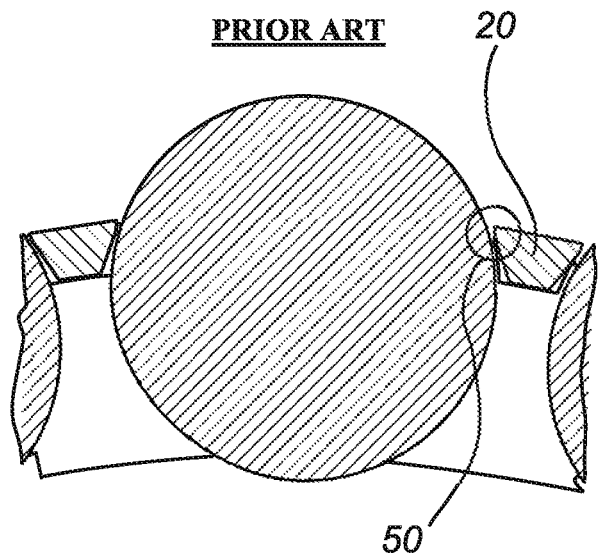
FIG. 5a shows cage bars of a bearing cage according to the prior art.

FIG. 5a shows two adjacent cage bars 20 of a bearing cage according to the prior art.

Figure 5B:
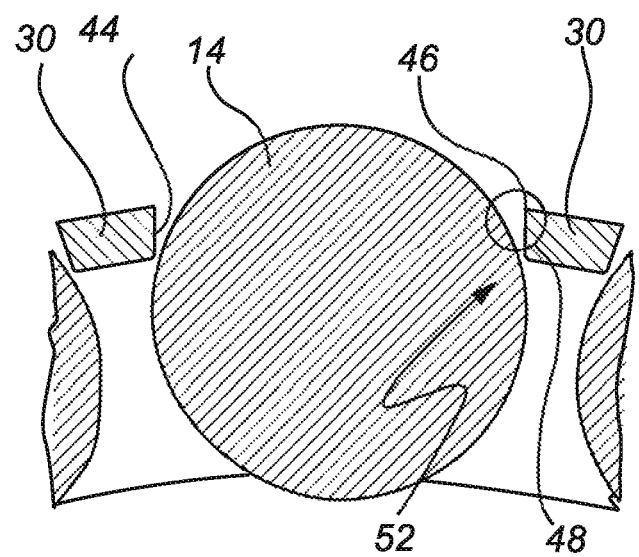
FIG. 5b shows cage bars of a bearing cage according to an embodiment of the invention, and It should be noted that the drawings have not been drawn to scale and that the dimensions of certain features have been exaggerated for the sake of clarity.

FIG. 5b shows two adjacent first cage bars 30 of a bearing cage according to an embodiment of the present invention. The first cage bars 30 comprise a side surface 44 that is arranged to extend along an outer surface of a rolling element 14 when a bearing cage is in use. The side surface 44 comprises a radially outer edge 46 and a radially inner edge 48 and the distance between the radially outer edges 46 of two adjacent cage bars 30 that accommodate a rolling element 14 therebetween when the bearing cage is in use, is larger than the distance between the radially inner edges 48 of the two adjacent cage bars 30. In this way lubricant can be accommodated in the space between the outer surface of a rolling element 14 and the side edge 44 of a cage bar 30. The side surface 44 of the at least one first cage bar 30 comprises at least one chamfered edge 52. The at least one chamfered edge 52 may be provided at the radially inner edge 52 of the first cage bar 30 as shown in the illustrated embodiment. In the cage bar according to the prior art shown in FIG. 5a each cage bar 20 comprises a lug 50 which limits the amount of lubricant that can be accommodated in the space between the surface of a rolling element 14 and the side edge of a cage bar 20. A cage bar 30 of a bearing cage according to an embodiment of the present invention does not comprise such a lug 50.

Since the side surfaces 44 of the cage bars 30 do not follow the curvature of the rolling elements 14, i.e. the side surfaces 44 of the cage bars 30 do not extend in a direction along the circumference of the rolling elements 14, the bearing elements 14 can be placed into the bearing cage from above, which facilitates assembly of the rolling element bearing.

Further modifications of the invention within the scope of the claims would be apparent to a skilled person. For example, a bearing cage may be constituted by a plurality of separate parts, such as by a pair of bearing cage halves.

The invention claimed is:

1. A bearing cage for retaining rolling elements of a rolling element bearing, the bearing cage having:
   first and second rings, wherein the first and second rings form opposite axial ends of the bearing cage, the first ring having a first ring maximum diameter and the second ring have a second ring maximum diameter;
   a first cage bar extending between the first and second rings and configured to define a side of a pocket that is configured to receive a rolling element therein; and
   wherein when the first cage bar is viewed in axial cross section the first cage bar has an apex located between and spaced from the first and second rings such that a first cage bar outer diameter is a maximum at the apex and is greater than the first and second ring maximum diameters.

2. The bearing cage according to claim 1, wherein the first cage bar further comprises a side surface that defines the side of the pocket, the side surface having a radially outer edge and a radially inner edge, wherein a distance between the radially outer edges of two adjacent cage bars between which a rolling element is located when the bearing cage is in use is greater than a distance between two adjacent radially inner edges of the two adjacent cage bars, the side surface of the first cage bar further comprising at least one chamfered edge.

3. The bearing cage according to claim 2, wherein the at least one chamfered edge is provided at the radially inner edge of the first cage bar.

4. The bearing cage according to claim 1, the bearing cage further comprising a second ring structure to which a second cage bar is connected, wherein the second ring structure is configured to be located radially inwards of the first cage bar.

5. The bearing cage according to claim 4, wherein the second cage bar is constructed so that the diameter of the second ring structure is largest at one of a point or a region along the length of the second cage bar so as to improve lubricant flow towards the rotational center of rolling elements when the bearing cage is in use.

6. The bearing cage according to claim 4, wherein the second ring structure is provided with at least one reservoir for an accommodation of lubricant when the bearing cage is in use.

7. The bearing cage according to claim 4, wherein the first and second rings are integrally formed with the second ring structure.

8. The bearing cage according to claim 4, wherein the first and second rings are arranged to be connected to the second ring structure.

9. The bearing cage according to claim 1, wherein the first cage bar is constructed so that a diameter of the bearing cage is largest at the apex so as to improve lubricant flow towards a rotational center of rolling elements when the bearing cage is in use.

10. The bearing cage according to claim 9, wherein the apex is configured to be located at a position above a center of the rolling surface of each rolling element when the bearing cage is in use.

11. The bearing cage according to claim 1, wherein the apex is provided halfway between the first and second rings.

12. The bearing cage according to claim 1, wherein the first cage bar comprises end portions that follow a rolling element diameter profile such that the end portions are configured so that they can contact an outer surface of the rolling element, and wherein the apex of the first cage bar is configured to be spaced from the outer surface of the rolling element.

13. The bearing cage according to claim 12, wherein the end portions extend over 5%-30% of the length of the first cage bar.

14. The bearing cage according to claim 12, wherein the end portions extend over 10-20% of the length of the first cage bar.

15. A rolling element bearing structure, comprising at least one bearing cage, the at least one bearing cage comprising:
   first and second rings, wherein the first and second rings form opposite axial ends of the at least one bearing cage, the first ring having a first ring maximum diameter and the second ring have a second ring maximum diameter;
   a first cage bar extending between the first and second rings and comprising a side surface that is configured to define a side of a pocket that is configured to receive a rolling element therein; and
   wherein when the first cage bar is viewed in axial cross section the first cage bar has an apex located between and spaced from the first and second rings such that a first cage bar outer diameter is a maximum at the apex and is greater than the first and second ring maximum diameters,
   wherein the first cage bar further comprises a side surface that defines the side of the pocket and has a radially outer edge and a radially inner edge, and
   wherein a distance between the radially outer edges of two adjacent cage bars between which a rolling element is located when the bearing cage is in use is greater than a distance between two adjacent radially inner edges of the two adjacent cage bars,
   wherein the at least one bearing cage is included in the rolling element bearing structure.

* * * * *